(12) United States Patent
Vangala

(10) Patent No.: US 7,171,237 B2
(45) Date of Patent: Jan. 30, 2007

(54) MODULAR TRANSCEIVER-MODEM WITH REDUCED PROFILE ANTENNA DUPLEXER

(75) Inventor: Reddy Vangala, Albuquerque, NM (US)

(73) Assignee: CTS Corporation, Elkhart, IN (US)

( * ) Notice: Subject to any disclaimer, the term of this patent is extended or adjusted under 35 U.S.C. 154(b) by 847 days.

(21) Appl. No.: 10/159,571

(22) Filed: May 31, 2002

(65) Prior Publication Data

US 2002/0186758 A1 Dec. 12, 2002

Related U.S. Application Data

(60) Provisional application No. 60/294,665, filed on May 31, 2001.

(51) Int. Cl.
*H04B 1/38* (2006.01)
*H04M 1/00* (2006.01)

(52) U.S. Cl. ............... 455/557; 455/90.3; 455/575.1; 455/558; 713/320; 713/302; 439/65

(58) Field of Classification Search ............... 455/90.3, 455/575.1, 557, 558; 713/320, 302; 439/65
See application file for complete search history.

(56) References Cited

U.S. PATENT DOCUMENTS

| | | | |
|---|---|---|---|
| 5,045,824 A | 9/1991 | Metroka | |
| 5,177,458 A | 1/1993 | Newell et al. | |
| 5,512,866 A | 4/1996 | Vangala et al. | |
| 5,628,055 A | 5/1997 | Stein | |
| 5,896,574 A | 4/1999 | Bass, Sr. | |
| 6,026,119 A | 2/2000 | Funk et al. | |
| 6,191,741 B1 | 2/2001 | Gauld et al. | |
| 6,804,541 B1* | 10/2004 | Muramatsu et al. | 455/573 |
| 2004/0203260 A1* | 10/2004 | Block et al. | 439/65 |

FOREIGN PATENT DOCUMENTS

| | | | |
|---|---|---|---|
| JP | 06334298 | * | 12/1994 |
| JP | 10321109 | * | 12/1998 |

OTHER PUBLICATIONS

AirCard Website Advertisement—Sierra Wireless May 11, 2001, http://www.sierrawireless.com/ProductsOrdering/spec_510nb.html.

* cited by examiner

*Primary Examiner*—Matthew D. Anderson
*Assistant Examiner*—Yuwen Pan
(74) *Attorney, Agent, or Firm*—Steven Weseman; Daniel J. Deneufbourg

(57) ABSTRACT

An embodiment of the invention is a modular card style radio-signal modem suitable for wireless data communication to a personal computer. The modem comprises a main circuit board substrate defining an opening, a card-to-computer connection interface operably linked to the circuit board, a radio transceiver on the circuit board in communication with the connection interface. The radio transceiver has a receiver input and a transmitter output. The card modem also includes a dielectric block antenna duplexer attached to the circuit board and suspended in the opening, the duplexer having a transmit signal input in electric communication with the transmitter output, a receive signal output in electric communication with the receiver input and an antenna connection electrode.

3 Claims, 5 Drawing Sheets

MODULAR TRANSCEIVER-MODEM WITH REDUCED PROFILE ANTENNA DUPLEXER

CROSS-REFERENCE TO RELATED APPLICATION

This application claims the benefit of the filing date of U.S. Provisional Patent Application Ser. No. 60/294,665, filed on May 31, 2001, which is explicitly incorporated by reference.

TECHNICAL FIELD

The invention relates to modular wireless telecommunication equipment and, more particularly, to a plug-in, card-style mounted radio transceiver and modem for use in establishing a data link between a communications network and portable electronic equipment such as a personal computer.

BACKGROUND

User applications for personal computers and other computer devices increasingly rely on a link to a communications network such as the Internet. Stationary PC systems may be linked to a network using various techniques: via traditional or high-speed digital phone lines, via office computer networks and via cable TV networks, among others.

The increasing reliance on a data network link for PC applications has fueled a demand for wireless communication technology to serve portable computing devices such as PC notebooks. One technical approach involves operably linking a modem-equipped PC notebook to a portable radio telephone of a wireless phone network. Users have identified the linking of two separate devices, i.e. the phone and the computer, as cumbersome, however.

The market for portable computing devices favors lighter and smaller designs while demanding the same functions as stationary systems. Options for modular expansion are therefore limited. Many PC notebooks and other computers, as well as some computing devices are designed to receive plug-in, removable expansion cards. Notebook computer manufacturers have almost universally adopted a standard expansion card interface established by the Personal Computer Memory Card International Association (PCMCIA), Sunnyvale, Calif. These standards define the electrical and physical specifications of the card including the interfaces between the card and the port or slot into which the card is inserted.

The specifications include a 16-bit PC Card interface and a 32-bit CardBus interface. The PCMCIA standards also specify three card form factors, called Type I, Type II and Type III. All three card types measure the same length (85.6 mm) and the same width (54.0 mm), and differ only in overall thickness. The Type I card has a thickness of 3.3 mm; the Type II card, 5.0 mm; and the Type III card, 10.5 mm. The PCMCIA interface is described in detail in the PCMCIA Specification (i.e., Personal Computer Memory Card International Association—PCMCIA Standard Release 2.1) which is hereby incorporated by reference.

There continues to be a need for a single PC card that provides both the transceiver function of a portable phone and the modem function. The PCMCIA standard imposes strict size constraints on the design of such a multifunction expansion card, however. The thickness specification—0.5 mm—of the popular Type II card particularly limits the thickness profile of all required electronic components.

This profile constraint has limited the selection of a key RF transceiver component, the antenna duplexer. Compared to other duplexer alternatives, ceramic block-based antenna duplexers are known to offer better performance at relatively low cost.

Such ceramic block filters offer several advantages. In the basic ceramic block filter design, the resonators are formed by passages, called holes, extending through the block from the long narrow side to the opposite long narrow side. The block is substantially plated with a conductive material (i.e. metallized) on all but one of its six (outer) sides and on the inside walls formed by the resonator holes.

One of the two opposing sides containing holes is not fully metallized, but instead bears a metallization pattern designed to couple input and output signals through the series of resonators. This patterned side is conventionally labeled the top of the block. In some designs, the pattern may extend to sides of the block, where input/output electrodes are formed and the block is surface mounted to a PCB.

The reactive coupling between adjacent resonators is dictated, at least to some extent, by the physical dimensions of each resonator, by the orientation of each resonator with respect to the other resonators, and by aspects of the top surface metallization pattern. Interactions are complex and difficult to predict. These filters may also be equipped with an external metallic shield attached to and positioned across the open-circuited end of the block in order to cancel parasitic coupling between non-adjacent resonators and to achieve acceptable stopbands.

The relatively large size of the ceramic block duplexer has limited their application for PCMCIA cards. The invention relates to this size limitation problem.

SUMMARY

An embodiment of the invention is a modular card style radio-signal modem suitable for wireless data communication to a personal computer. The modem comprises a main circuit board substrate defining an opening, a card-to-computer connection interface operably linked to the circuit board, and a radio transceiver on the circuit board in communication with the connection interface. The radio transceiver has a receiver input and a transmitter output. The card modem also includes a dielectric block antenna duplexer attached to the circuit board and suspended in the opening, the duplexer having a transmit signal input in electric communication with the transmitter output, a receive signal output in electric communication with the receiver input and an antenna connection electrode.

In a preferred embodiment, the modular card is packaged in a housing with dimensions conforming to the Type II Personal Computer Memory Card Interface Association (PCMCIA) card standard.

There are other advantages and features of this invention which will be more readily apparent from the following detailed description of the preferred embodiment of the invention, the drawings, and the appended claims.

BRIEF DESCRIPTION OF THE FIGURES

In the accompanying drawings that form part of the specification, and in which like numerals are employed to designate like parts throughout the same.

DETAILED DESCRIPTION OF THE PREFERRED EMBODIMENT

While this invention is susceptible to embodiment in many different forms, this specification and the accompanying drawings disclose only preferred forms as examples of the invention. The invention is not intended to be limited to the embodiments so described, however. The scope of the invention is identified in the appended claims.

Figure 1:
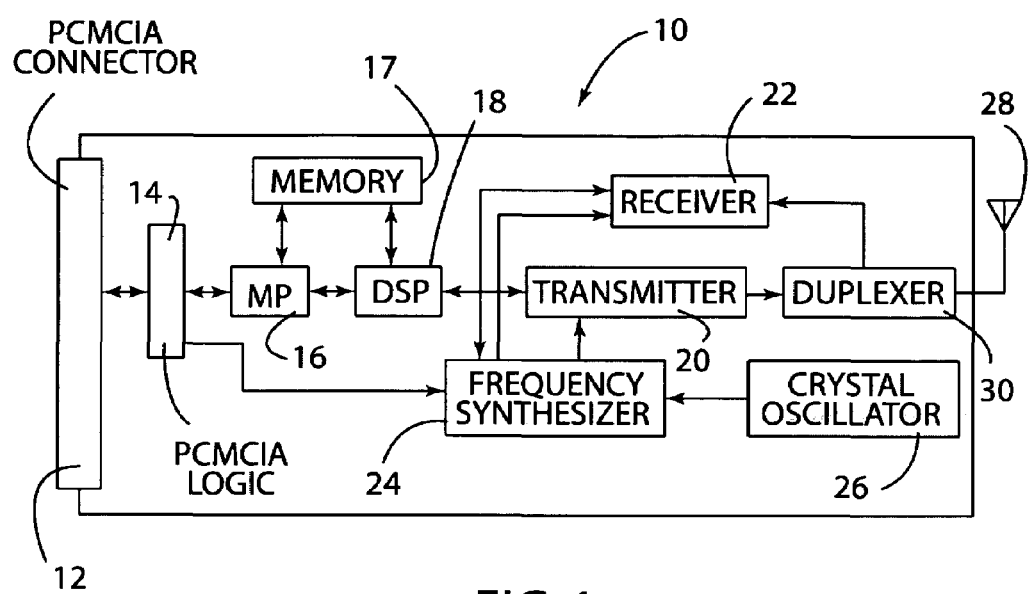
FIG. 1 is a simplified block diagram illustrating the circuit elements of a radio transceiver module.

In FIG. 1, a single block or cell may indicate several individual components and/or circuits that collectively perform a single function. Likewise, a single line may represent several individual signals or energy transmission paths for performing a particular operation.

Referring to FIG. 1 is a block diagram of a modular radio-signal modem in the form of a PCMCIA card 10. Card 10 includes a PCMCIA connector 12 and a radio transceiver. The radio transceiver of card 10 includes interface logic 14, a microcontroller 16, a memory 17, a digital signal processor 18, a transmitter subcircuit 20 for modulating signals and a receiver subcircuit 22 for demodulating signals.

Connector 12 serves as a card-to-computer connection interface.

Transmitter 20 generates an RF signal at a carrier frequency using a baseband signal and a carrier frequency, modulating the carrier frequency with the baseband signal and a carrier frequency. Receiver 22 generates a baseband signal from an RF signal. Transmitter 20 and receiver 22 rely on local oscillator signals produced by programmable frequency synthesizer 24. A crystal oscillator 26, which preferably includes temperature compensation, provides a reference signal to frequency synthesizer 24.

Although the present invention is depicted with only a signal receive/transmit stage, multiple stages are contemplated. For example, a superheterodyne receiver may be utilized with IF stages, IF filters and amplifiers.

Transmitter 20 and receiver 22 share a common antenna 28. Critical to the sharing arrangement is a duplexer filter 30. Duplexer 30 prevents the relatively powerful transmit signal from interfering with the reception of receive bands. Duplexer filter 30 allows the transmitter and receiver to operate simultaneously, and hence allows the computer to send and receive at the same time. Duplexer filter 30 is a three-port filter coupled to the antenna, the receiver, and the transmitter.

Thus, it provides a low impedance path from the transmitter to the antenna for signals over the transmit frequencies, and a high impedance path from the transmitter to the receiver, so that the receiver is isolated from the transmit signals. Duplexer filter 30 also provides a low impedance path between the antenna and receiver for signals over the receive frequencies, and a high impedance path between the receiver and transmitter, so that the transmitter is isolated from the receive signals.

Except for connector 12, the crystal of oscillator 26, duplexer 30, and antenna 28, any subset of the circuit functions can be provided by a single integrated circuit semiconductor device.

The system of the present invention includes providing radio transceiver modems adapted for use with the various wireless/radio communication networks in accordance with various standards used therein. Additionally, the term "transceiver" as used herein comprises appropriate radio control logic of the type necessary to make up a radio device that is capable of communicating with a wireless communication standard. For example, the transceiver may include a transmitter and receiver, and when the communications device is used for data transmission, the transceiver may also incorporate data modem circuitry. Each of the telecommunication networks may include different telecommunication standards and/or require modems of different types. Examples include the Personal Communication System—PCS (U.S., JAPAN, KOREA, etc.) AMPS, D-AMPS, JDC, TACS, and GSM standards.

Figure 2:
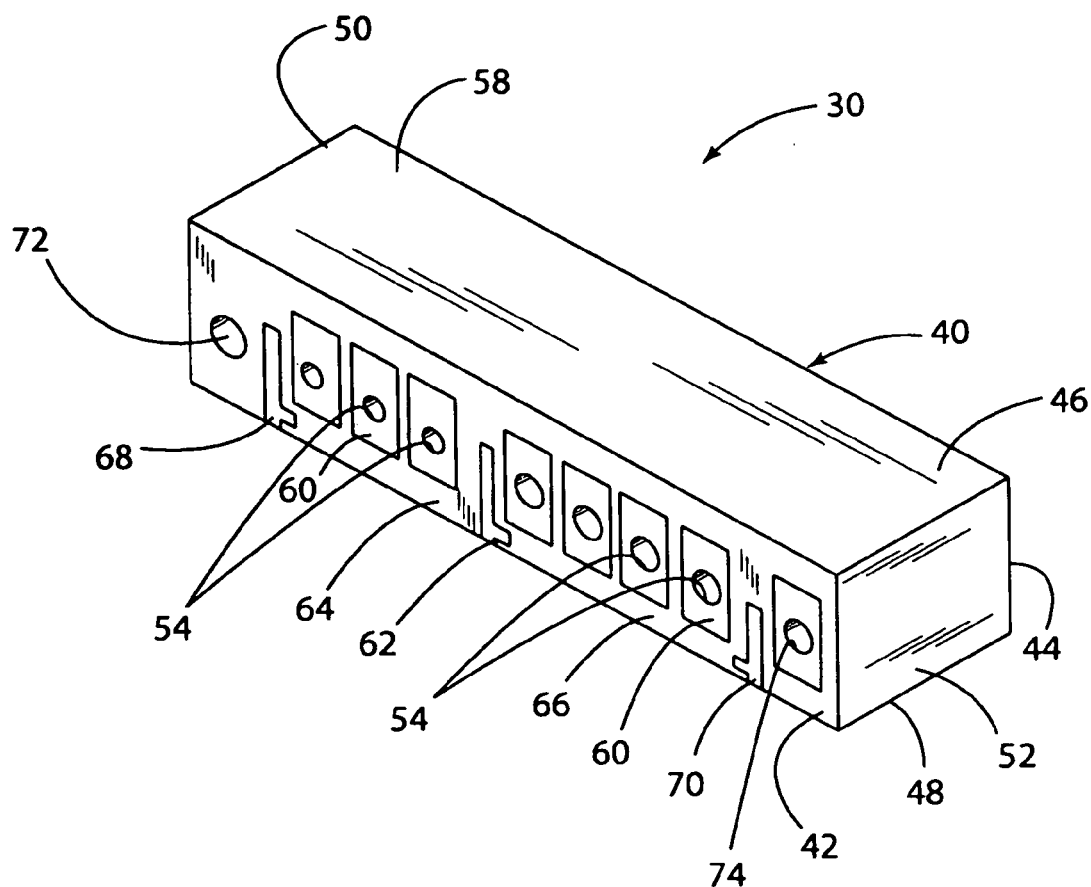
FIG. 2 is a perspective view of an exemplary ceramic block duplexer shown without a shield to illustrate top surface details.

Referring to FIG. 2, an exemplary antenna duplexer (RF filter) 30 comprises an elongate, box-shaped block of dielectric material 40. Block 40 has an outer surface with six sides, a top 42, a bottom 44, a first end 46, an opposite second end 48, and elongate side portions 50 and 52. The ceramic filter defines a plurality of resonators. In this preferred embodiment, the resonators take the form of metallized through-holes (or bores) 54 defined in dielectric block 40 from top surface 42 to bottom surface 44. More specifically, the inner side walls 56 which define the through-holes 54 are coated with a contiguous layer of conductive material, i.e. metallized.

The metallization layer (or coating) 58 extends contiguously from within the resonator holes 54 towards both top surface 42 and bottom surface 44. At top surface 42, the extending metallization layer terminates in resonator pads 60, which could also be labeled electrodes. Resonator pads 60 have predetermined capacitances to adjacent resonators and other areas of metallization.

The metallization layer continues from within holes 54 over the bottom surface 44 and about each side surfaces 46, 48, 50 and 52. Accordingly, the continuous metallization layer 58, which is typically a silver-containing material, is applied to substantial portions of bottom surface 44 and side surfaces 46, 48, 50 and 52. This relatively wide-area metallization layer 58 serves as a local ground potential supply and may also be labeled a ground electrode.

For ease of description, duplexer 30 can be dividend at antenna electrode (or pad) 62 into two branches of resonators 54, a transmitter branch 64 and a receiver branch 66. Transmitter branch 64 extends between antenna electrode 62 and first end 50, while receiver branch 66 extends in the opposite direction between antenna electrode 62 and second end 52. Each branch includes a plurality of resonators 54 and a respective input/output electrode. More specifically, transmitter branch 64 includes a transmitter electrode 68, and receiver branch 66 includes a receiver electrode 70. Transmitter electrode 68 and receiver electrode 70 are spaced apart from antenna electrode in opposite directions along the length of block 40.

The antenna, transmit and receive electrodes 62, 68, and 70 are defined by metallization patterns on both top surface 42 and side surface 48. These electrodes extend into tabs on the side surface 48 which serve as surface mounting connection points.

Resonator pads 60 and electrodes (62, 68 and 70) and additional features together make up a metallization pattern on top surface 42. Areas of metallization are spaced apart from one another, and are thereby capacitively coupled. The amount of capacitive coupling is roughly related to the size of the metallization areas and the separation distance between adjacent metallized portions as well as the overall block configuration.

Transmitter branch 64 includes a trap resonator 72. Trap resonators, such as resonator 72, are configured to produce a zero, or attenuation pole, in the transfer function of the filter. To serve as a frequency trap, the resonator is located adjacent transmitter electrode 68 but opposite the array of spaced-apart resonators 54 which extend between antenna electrode 62 and transmitter electrode 68. More specifically, trap resonator 72 is positioned between transmitter electrode 68 and first end 50 of block 40.

Receiver branch 66 includes a trap resonator 74 positioned between receive electrode 70 and second end 52 of block 40.

Figure 3:
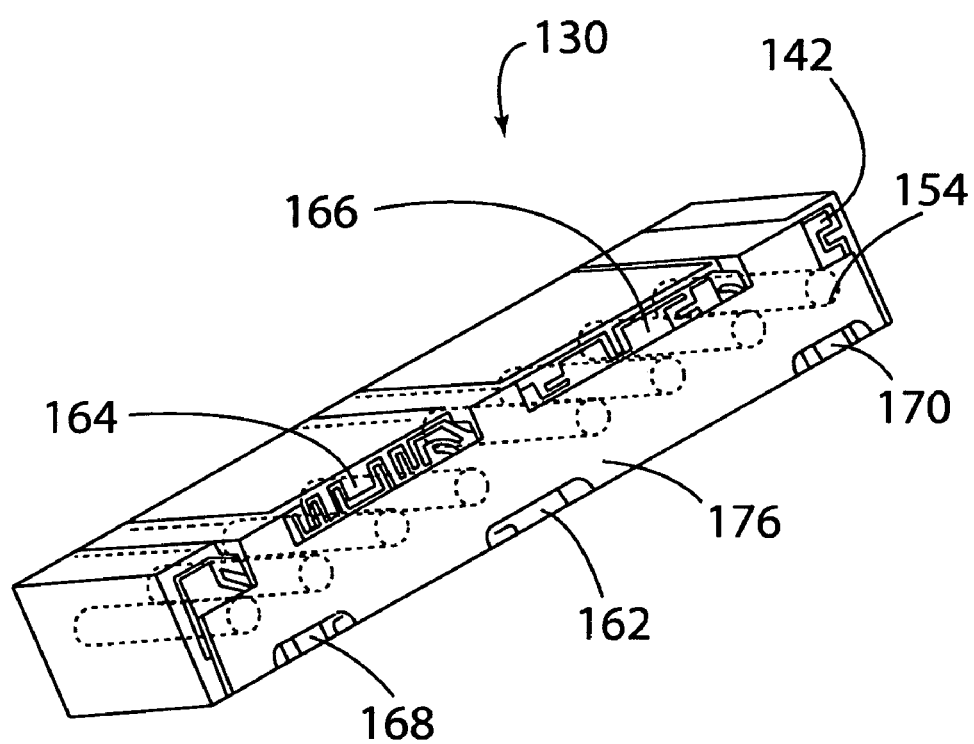
FIG. 3 is a perspective view of an exemplary ceramic block duplexer component of the invention.

FIG. 3 shows an exemplary ceramic block duplexer filter 130 equipped with a shield 176 positioned across top surface 142 to cancel parasitic coupling between non-adjacent resonators and to improve stopbands. As illustrated, filter 130 includes resonators 154, a transmit branch 164 and a receive branch 166.

Figure 4:
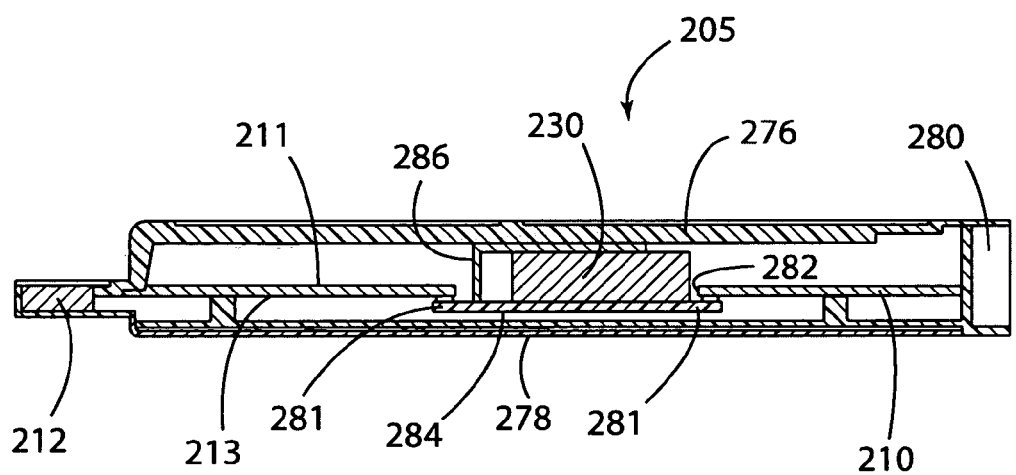
FIG. 4 is a simplified cross-sectional view of a radio transceiver PCMCIA module according to the invention.

Ceramic block duplexers, such as duplexers 30 and 130, provide superior filtering performance. FIG. 4 is a simplified cross-sectional view of a radio transceiver modem module 205 demonstrating a duplexer mounting scheme compatible with the PCMCIA standard. Module 205 includes a printed circuit board (PCB) 210 with an upper surface 211 and lower surface 213. PCB 210 is also properly labeled a main circuit board. Both upper surface 211 and lower surface 213 support one or more electronic components to provide circuit functions as described above for PC card 10. Formed and/or mounted on the surfaces of PCB 210 are printed circuit card traces and various components, for example, ASICs (Application Specific Integrated Circuits) which together comprise the radio transceiver with modem secured within module 205. The circuitry on PCB 210 is selectively connected to contacts on the PCMCIA connector 212 to couple signals into and out of the circuitry within module 205.

An upper shell 276 covers upper portion 211 of the components mounted to PCB 210, while a lower shell 278 covers lower surface 213 and mates with the upper shell 276 to form an enclosed modular PCMCIA unit. Operably linked to PCB 210 is a PCMCIA standard connector 212. Module 205 includes a recessed end 280 wherein connectors may be mounted for use in coupling an antenna.

Module 205 includes a specially mounted ceramic block duplexer filter 230. PCB 210 defines an opening 282 wherein duplexer filter 230 is suspended. In a preferred embodiment, duplexer 230 is part of a subassembly which includes an extension board 284 and a shield 286. Extension board 284 may also be called a carrier substrate or expansion board.

Figure 5:
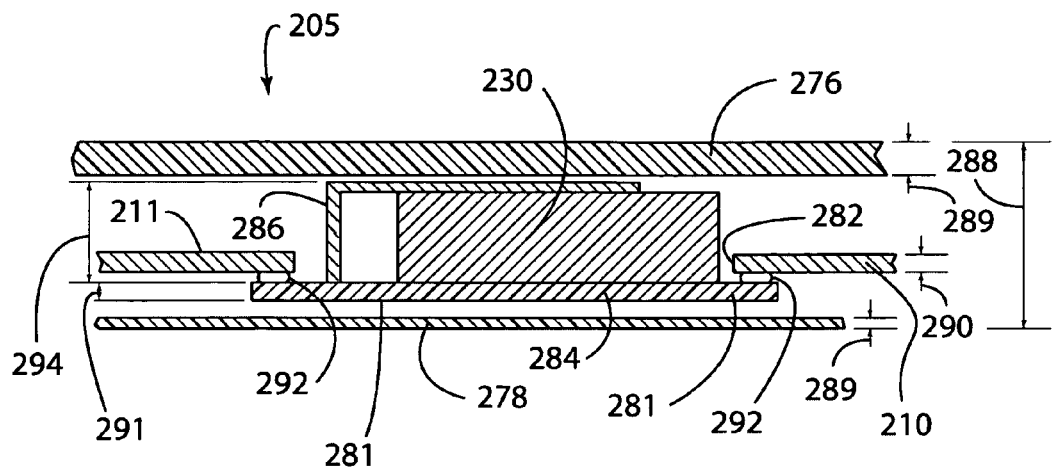
FIG. 5 is a schematic fragmentary cross-sectional view of a transceiver modem illustrating an embodiment of the invention.
Figure 6:
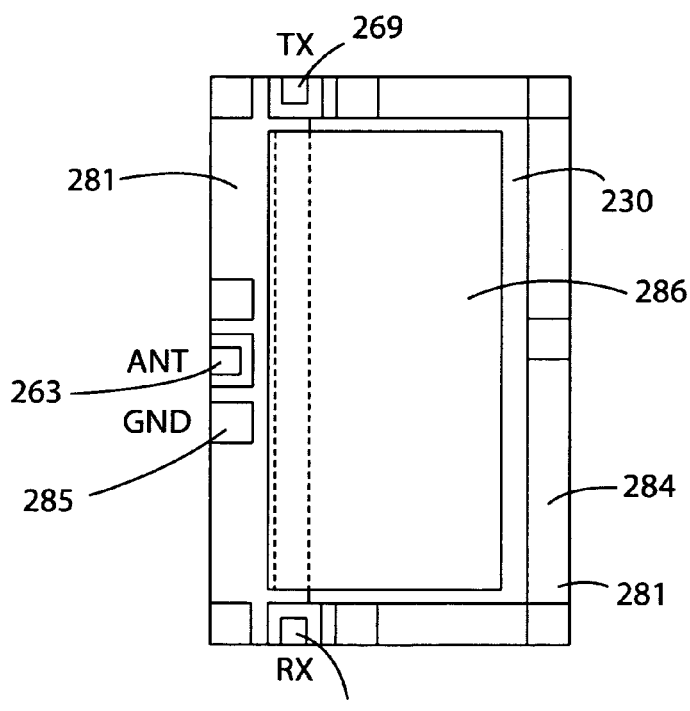
FIG. 6 is a plan view of the block duplexer filter with expansion board shown in FIG. 5.

FIGS. 5 and 6 reveal details of the mounting scheme. Duplexer filter 230 is surface mounted to extension board 284. Extension board 284 includes separate electrodes operably linked to the antenna, transmit and receive electrodes of filter 230. Specifically, extension board 284 includes an antenna electrode 263 conductively linked to the antenna electrode of filter 230 (such as antenna electrode 62).

Extension board 284 also includes a transmit electrode 269 conductively linked to the transmit electrode of filter 230 (such as transmit electrode 68). Extension board 284 also includes a receive electrode 271 operably linked to the receive electrode of filter 230 (such as receive electrode 70). Also provided on extension board 284 are one or more ground connections 285.

The PCMCIA standard dictates that module 205 have a thickness 288 not exceeding 5 millimeters (mm). In a preferred embodiment of module 205, upper shell 276 and lower shell 278 have a thickness 289 not exceeding 0.18 mm. PCB 210 has a thickness 290 not exceeding 0.9 mm. Extension board 284 has a thickness 291 not exceeding 0.2 mm.

Extension board 284 is preferably mounted to PCB 210 by solder pumps 292, which provide conductive connections between the electrodes 263, 269 and 271 and connection points on extension board 284. Mounting with epoxy or conductive epoxy is also contemplated. The solder pumps 292 preferably add not more than about 0.1 mm. Extension board 284 includes an extending portion 281 attached to the PCB 210 at positions offset from the periphery of opening 282.

For a modem transceiver PCMCIA module for a United States PCS based network, a preferred duplexer has a thickness 294 (including shield) of about 3.15 mm. Presented in Table I, below, are the measured performance parameters of a U.S. PCS ceramic block duplexer having a length of about 25 mm, a height of about 6.7 mm and a thickness about 3.15 mm and a power handling capacity of about 3.0 watts.

TABLE I

|  | Frequency (MHz) | Measurement @ 25° C. (dB) |
| --- | --- | --- |
| Antenna to Transmit Response: | | |
| Passband Insertion Loss | 1850–1910 | 3.4 |
| Passband Ripple | 1850–1910 | 2.1 |
| Passband Return Loss | 1850–1910 | 12 |
| Reflection @ RX Band | 1930–1990 | 40 |
| Antenna to Receive Response: | 1930–1990 | 3.6 |
| Passband Insertion Loss | 1930–1990 | 2.5 |
| Passband Return Loss | 1930–1990 | 12.0 |
| Rejection @ TX Band | 1850–1910 | 50 |
| Transmit to Receive Response: | | |
| Rejection @ TX Band | 1850–1910 | 53 |
| Rejection @ RX Band | 1930–1990 | 43 |

Numerous variations and modifications of the embodiments described above may be effected without departing from the spirit and scope of the novel features of the invention. No limitations with respect to the specific system illustrated herein are intended or should be inferred. It is, of course, intended to cover by the appended claims all such modifications as fall within the scope of the claims.

I claim:

1. A modular card style radio-signal modem suitable for wireless data communication to a personal computer, the modem comprising:
   a main circuit board substrate defining an opening;
   a card-to-computer connection interface operably linked to the circuit board;

a radio transceiver on the circuit board in communication with said connection interface, the radio transceiver having a receiver input and a transmitter output;

a carrier substrate attached at the periphery offset of the opening such that a portion of the substrate extends over the opening; and a dielectric block antenna duplexer surface mounted to the carrier substrate on the portion that extends over the opening, the antenna duplexer being an elongate ceramic block and having a transmit electrode in electric communication with the transmitter output, a receive electrode in electric communication with the receiver input and an antenna connection electrode, the antenna duplexer further including:

a transmitter branch extending between the antenna electrode and a first end of the block;

a receiver branch extending between the antenna electrode and a second end of the block;

each branch having a plurality of through-hole resonators;

a local ground conductive layer on the elongate block;

the transmit electrode being spaced apart from the antenna electrode along a length of the block and positioned in the transmitter branch; and the receive electrode being spaced apart from the antenna electrode along the length of the block and positioned in the receiver branch.

2. The modular card style radio-signal modem of claim 1, packaged in a housing with dimensions conforming to the Type II Personal Computer Memory Card Interface Association (PCMCIA) card standard.

3. The modular card style radio-signal modem of claim 1, wherein each branch includes at least two resonators.

* * * * *